UNITED STATES PATENT OFFICE.

HOWARD N. COPTHORNE, OF CHICAGO, ILLINOIS, AND ARTHUR L. TANNEHILL, OF GARY, INDIANA.

PROCESS OF PRODUCING ARTIFICIAL RESIN.

1,353,220.   Specification of Letters Patent.   Patented Sept. 21, 1920.

No Drawing.   Application filed June 5, 1919. Serial No. 301,971.

*To all whom it may concern:*

Be it known that we, HOWARD N. COPTHORNE, a citizen of the United States, residing at Chicago, in the county of Cook and State of Illinois, and ARTHUR L. TANNEHILL, a citizen of the United States, residing at Gary, in the county of Lake and State of Indiana, have invented certain new and useful Improvements in Processes of Producing Artificial Resin, of which the following is a specification.

The object of the present invention is to produce artificial resin in solution by the treatment of light oils obtained from coal gas or from distillates of coal tar.

The present invention proceeds upon the facts that a relatively large available source of paracumarone exists in the solvent naphtha fractions of light oils which remain behind in the step of distilling benzol, toluol, etc., and particularly in those fractions of such light oil which distil at temperatures above 130° (those distilling between 150° and 200° C. being used); that the heavier fractions, particularly those distilling between 150° and 200° respond to the polymerizing effect of a soluble acid (e. g. $H_2SO_4$) while the lighter fractions, or those below 130° do not so respond, yet do not interfere with the polymerization of the heavier particles even though present during the operation; and that by selecting a proper proportion of the lighter fractions with the heavier fractions, the paracumarone resulting from the polymerization will remain in solution when produced. Hence, the present invention consists in producing, in this way, as a commercial product, artificial resin which remains sufficiently in solution to facilitate the procedure of polymerization to the full extent if desired, to permit settling out and drawing off of the acid if used in excess and when the action is complete or is to be arrested, to permit neutralization of the material when developed to the desired degree, to permit settling and separation of the precipitate resulting from neutralization, to facilitate handling by flowing or pouring and to remain in such fluid or liquid form, if desired, for use in the form of a varnish or liquid substitute for varnish in paints, and, finally, to be available for solidification by distillation if needed in the latter form.

In the practice of the invention, all those light oil distillates of coal gas or coal tar may be employed which distil at from 130° to 200° C. for the production of the paracumarone, those fractions which distil at from 150° to 200° C. being especially adapted for the process, and some of these heavier fractions, and particularly those distilling between 130° and 150°, left unpolymerized by the timing of the process, together with such proportion as may be necessary of fractions distilling at below 130°, being employed to retain the resultant paracumarone in solution.

The consistency of the resultant product may be determined even when heavier distillates alone are used, namely, by limiting the extent of polymerization either by restricting the proportion of acid introduced, or, where an excess of acid is employed, by restricting the duration of the action, or selecting the time for settling and drawing off the acid and neutralizing the material. But since the presence of the lighter fractions (those distilling at below 130°) does not interfere with the polymerizing of the heavier fractions, the retention of the solution may be insured by employing a suitable proportion of these lighter distillates. In the interest of economy this will be preferable to maintaining the solution by leaving unpolymerized any considerable proportion of the heavier fractions which are convertible into the resin desired to be obtained.

As an illustrative procedure, take 100 pounds of the heavier or 130—200 fraction, together with a sufficient quantity—say an equal quantity—of the lighter (under 130°) fraction to insure fluidity, and after deodorizing it if desired by washing in a 1.2% solution of caustic soda but without any other preparation, add about 1⅓%, or say 1.37 pounds of concentrated sulfuric acid (66° B.), and agitate the mixture until complete or the desired degree of polymerization has taken place. The acid should now be separated by discontinuing agitation, permitting the acid to settle, and then drawing it off, after which the material is neutralized by means of a suitable alkali. This may be in the form of calcium oxid, of which about 1.5 pounds would be sufficient for the purpose, and would produce a precipitate of calcium sulfate saturated with a portion of the resin, but we prefer to use as a neutralizing agent ammonia gas caused to stream through a body of material. A distinct advantage in using this neutralizing agent arises from the fact that it passes through the material and does not remain in it, so that except for settling out the relatively small proportion of ammonium sulfate that may develop the removal of the reagent does not have to be reckoned with. In the precipitation of sulfate of calcium or sulfate of ammonium separation would be so complete as to render filtration unnecessary.

The specific gravity of the resin in solution obtained by this process will be about 1.06. It will consist of the artificial resin developed by the polymerization, dissolved in unpolymerized distillate, or distillate of the fraction recovered at below 130° C. and unpolymerizable.

The resin in solution obtained by this process may be applied to metal or other surfaces for the protection thereof, and when so applied will readily dry and form a film having the quality of resisting moisture and acids. It may also be used as a gloss-imparting ingredient in paint. It may also be treated by distillation and the resinous content thereof recovered as a solid for use in the arts.

Obviously, the consistency of the fluid product may be controlled by the proportion of acid employed, even to the point of solidification. The consistency can be controlled by the addition or removal of the lighter fraction solvent.

We claim:

1. The process of producing artificial resin in solution, which consists in adding sulfuric acid to a solution of the lighter and heavier fractions of the light oil distillates of coal gas and coal tar in the absence of water or other acid solutions and in about the proportion of 1⅓ per cent. of the acid, and neutralizing the resultant solution.

2. The process of producing artificial resin in solution, which consists in adding sulfuric acid to a solution of the lighter and heavier fractions of the light oil distillates of coal gas and coal tar in the absence of water or other acid solutions and in about the proportion of 1⅓ per cent. of the acid, and neutralizing the resultant solution by ammonia gas.

Signed at Chicago, in the county of Cook, and State of Illinois, this 22nd day of May, 1919.

HOWARD N. COPTHORNE.

Signed at Gary, in the county of Lake, and State of Indiana, this 29th day of May, 1919.

ARTHUR L. TANNEHILL.